US012461731B2

(12) United States Patent
Oliver et al.

(10) Patent No.: US 12,461,731 B2
(45) Date of Patent: Nov. 4, 2025

(54) HANDS-FREE DEPLOYMENT OF GEOGRAPHICALLY LINKED APPLICATIONS (71) Applicant: Intel Corporation, Santa Clara, CA (US)

(72) Inventors: Dario Nicolas Oliver, Hillsboro, OR (US); Marcos E. Carranza, Portland, OR (US); Cesar Martinez-Spessot, Hillsboro, OR (US); Francesc Guim Bernat, Barcelona (ES); Mateo Guzman, Beaverton, OR (US); Sindhu Pandian, Hillsboro, OR (US); Ignacio Javier Alvarez Martinez, Portland, OR (US); Mats Gustav Agerstam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1145 days.

(21) Appl. No.: 17/131,561

(22) Filed: Dec. 22, 2020

(65) Prior Publication Data

US 2021/0109731 A1 Apr. 15, 2021

(51) Int. Cl.
G06F 8/61 (2018.01)
G06F 21/71 (2013.01)
H04B 1/38 (2015.01)
H04L 67/12 (2022.01)
H04L 67/141 (2022.01)
(Continued)

(52) U.S. Cl.
CPC ............... *G06F 8/62* (2013.01); *G06F 21/71* (2013.01); *H04B 1/38* (2013.01); *H04L 67/12* (2013.01); *H04L 67/141* (2013.01); *H04L 67/52* (2022.05); *H04W 12/033* (2021.01); *G06F 2221/2111* (2013.01); *G06F 2221/2149* (2013.01)

(58) Field of Classification Search
CPC .................................. G06F 8/62; G06F 21/71
See application file for complete search history.

(56) References Cited

U.S. PATENT DOCUMENTS

2002/0107616 A1* 8/2002 Delaruelle .......... B61L 15/0081
701/19
2006/0129289 A1* 6/2006 Kumar ................ B61L 15/0081
105/26.05
(Continued)

OTHER PUBLICATIONS

"European Application Serial No. 21198505.6, Extended European Search Report mailed Feb. 23, 2022", 14 pgs.
(Continued)

*Primary Examiner* — Lewis A Bullock, Jr.
*Assistant Examiner* — Theodore E Hebert
(74) *Attorney, Agent, or Firm* — Schwegman Lundberg & Woessner, P.A.

(57) ABSTRACT

System and techniques for hands-free deployment of geographically linked applications are described herein. A radio transceiver of a vehicle may detect a beacon. Here, the beacon includes an indication that an application linked to a geographical area covered by the beacon is available. The vehicle may establish a secure communications link with an application server corresponding to the beacon and receive, through the secure communications link, an application. Then, the vehicle may execute the application in a protected execution environment without intervention by a user of the vehicle.

23 Claims, 7 Drawing Sheets (51) Int. Cl.
*H04L 67/52* (2022.01)
*H04W 12/033* (2021.01)

(56) References Cited

U.S. PATENT DOCUMENTS

| | | | | |
|---|---|---|---|---|
| 2014/0256380 | A1* | 9/2014 | Ortega | B60R 11/0241 |
| | | | | 455/557 |
| 2015/0355893 | A1* | 12/2015 | Luk | G06F 21/60 |
| | | | | 717/178 |
| 2017/0171754 | A1* | 6/2017 | South | H04W 12/06 |
| 2017/0364344 | A1* | 12/2017 | Wang | G06F 16/29 |
| 2019/0155589 | A1* | 5/2019 | Armand | H04W 4/60 |
| 2019/0173866 | A1* | 6/2019 | Lyman | H04L 63/20 |
| 2020/0394031 | A1* | 12/2020 | Kim | G06F 8/65 |
| 2022/0308856 | A1* | 9/2022 | Kim | G06F 8/71 |

OTHER PUBLICATIONS

"Spotify", [Online]. Retrieved from the Internet: URL: https: explore.spotify.com us, (Accessed on Dec. 13, 2021), 9 pgs.

"Android for Cars", [Online]. Retrieved from the Internet: URL: https: developer.android.com training cars, (Accessed on Dec. 13, 2021), 6 pgs.

"The Tesla App Store", [Online]. Retrieved from the Internet: URL: https: cleantechnica.com Aug. 6, 2020 the-tesla-app-store-or-whatever-is-coming-eventually , (Accessed on Dec. 13, 2021), 9 pgs.

"Portland Transit TriMet Live Application", [Online]. Retrieved from the Internet: URL: https: web.archive.org web 20190518032347 https: play.google.com store apps details?id=com.otoole.trimetlive, (Accessed on May 18, 2019), 3 pgs.

"European Application Serial No. 21198505.6, Response filed Nov. 10, 2022 to Extended European Search Report mailed Feb. 23, 2022", 10 pgs.

"European Application Serial No. 21198505.6, Response filed Dec. 17, 2024 to Communication Pursuant to Article 94(3) EPC mailed Aug. 23, 2024", 12 pgs.

"European Application Serial No. 21198505.6, Communication Pursuant to Article 94(3) EPC mailed Aug. 23, 2024", 8 pgs.

* cited by examiner

HANDS-FREE DEPLOYMENT OF GEOGRAPHICALLY LINKED APPLICATIONS

TECHNICAL FIELD

Embodiments described herein generally relate to automated vehicle application distribution and more specifically to hands-free deployment of geographically linked applications.

BACKGROUND

Geographically linked or contextual services generally involve the use of an application on a user device to provide context specific functionality. For example, upon entering a museum, a user may download an application to a mobile phone, the application providing a tour or explanations of the museum's exhibits. These geographically linked or contextual services may be considered Smart City services in a variety of contexts.

Automated vehicles include systems to assist drivers or to fully control the vehicle without driver intervention. Automated vehicles may be used in mobility-as-a-service (MaaS) applications, in which a passenger may call a vehicle and the vehicles autonomously delivers the passenger to a destination. While the hardware to sense the environment or control the vehicle generally inhabits the automated vehicle. MaaS may employ external hardware to provide services that interact with the passenger (e.g., through a MaaS cloud service, a passenger application, etc.).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

With respect to Smart City services and the like, a general use case involves user interaction. This interaction may include searching and downloading an app to a mobile device of the user. For example, before going to the MET in NYC, you should download the Metropolitan Museum of Art (the MET) app for using tickets or getting maps. Further, once the user leaves the MET, the user should remove the app because it may not be useful outside the geographical context of the MET. A problem that may arise with the user interaction includes informing users that the service is even available. That is, the user must be aware of the existence of Smart City services that are relevant to a given location before seeking the application out to download and run. Several of these services or the mobile applications to consume them may be unknown to the target users, if users don't use the service due to lack of knowledge, investment on developing or deploying those services are wasted.

The problems with Smart City services and the like expand as more devices become available to consume those services. An example of one such device, with different user interaction characteristics than a mobile phone, are automated vehicles (AV), whether privately owned or in a MaaS system. In either case, the ability of a geographic venue to post placards or the like to inform users about the presence of services, or instructions how to obtain a service, is more limited than an individual walking into the venue. Moreover, when a user's attention is focused on controlling a vehicle in a safe manner, additional user interactions to identify, download, and run an application may be inconvenient or dangerous.

Some attempts to bring geographical linked services to vehicles include factory installation of application, manual deployment of applications to the vehicle, or manual deployment to a user device connected to the vehicle. Factory installed applications are installed by default in the vehicle (e.g., in an infotainment system of the vehicle) and are always available to the current user of the vehicle. Factory installation may include several issues. For example, applications are installed without regard to whether they are useful of desirable to a user, consuming resources (e.g., processing, storage, etc.) in the vehicle. Generally, these applications cannot be removed from the vehicle and are embedded (e.g., integrated) in several built-in functionalities. Some of these applications are subscriptions in which a user wanting to use the application needs to provide personal credentials to access the service even if the vehicle is not theirs, as is the case in rental vehicles or MaaS vehicles. In this case, the user must remember to remove the credentials or user data to avoid abuse by others.

Manual deployment in the vehicle involves the user manually (e.g., proactively) searching, downloading and installing the application in the vehicle (e.g., in an infotainment device of the vehicle). Manual deployment in a vehicle may also involve several issues, such as requiring user interaction for discovering, installing, or removing the applications. Also, several versions of the same application may need to be available for the different automotive operating systems. This may create silos (e.g., each target platform has its own application ecosystem), increasing the cost for developing and deploying applications.

Manual deployment in a user device, such as a mobile phone, operates like traditional Smart City applications with the exception that the mobile device interfaces with the vehicle. Again, the manual nature of the deployment involves a burden on users to identify and manage the application. Further, there is a question of integration between the mobile device and the vehicle system, possibly leading to less functional applications, or the silo effect noted above.

To address these issues, a combination of contextual information, discovery, and deployment technologies may be used to implement a hands-free (e.g., hands-off or automatic) lifecycle—e.g., discovery, deployment, removal—of geographically linked applications in a vehicle. For example, using edge or cloud providers and trusted execution environments (TEE)—such as Software Guard Extensions (SGX). Trust Domain Extensions (TDE)—to provide isolated or secure access to the system resources, an automated vehicle may provide an enhanced and secure user experience to discover, deploy, or retire geographically linked applications.

In an example, the vehicle autonomously (automatically) discovers geographically-linked applications based on contextual aspects-such as geolocation or the presence of a beacon-attests the identity of the vehicle or a current user, provides capabilities present and currently available in the vehicle, and automatically deploys (e.g., downloads, installs, and runs) the geographically-linked application in an isolated and secure environment. Once the application is no longer needed-such as when the vehicle leaves the geographical area covered by the geographically-linked application—the application may be proactively retired (e.g., removed) from the vehicle. In most scenarios, the entire process is performed hands-free, without user intervention or even attention. The trust and confidentiality provided by the TEE enable the noninteractive aspect by enabling users to be sure that the integrity of the vehicle driving system or the user's personal data will not be compromised. Further, because isolation may be bidirectional—the host cannot inspect the application running in the isolated environment, which protects the data of the application vendor and sensitive data of the user—and the application cannot inspect the part of the host for which access was not granted, which protects the host assets and user information from disclosure to an unauthorized party, the automatic execution causes few issues. Additional details and examples are described below.

Figure 1:
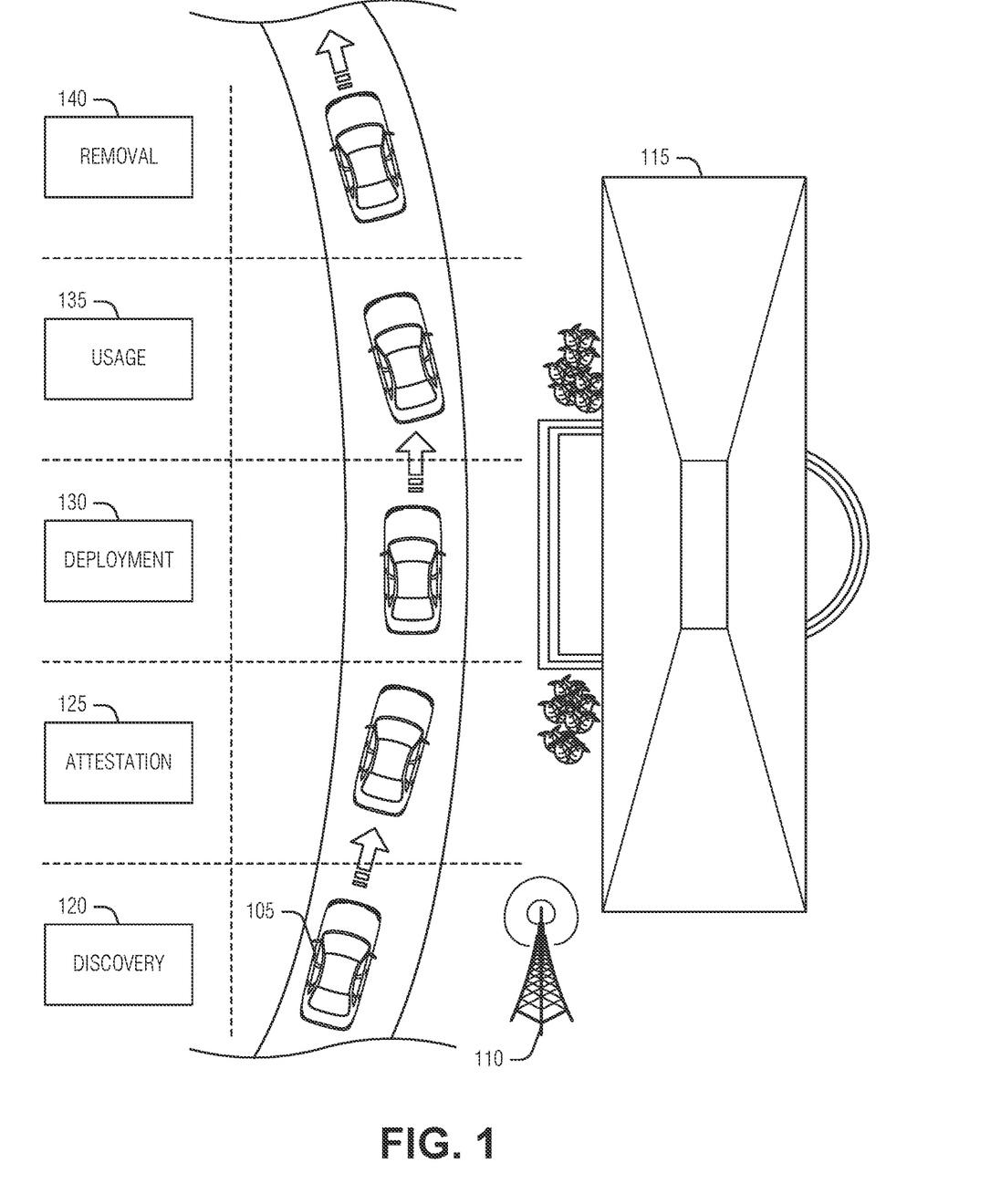
FIG. 1 is a block diagram of an example of an environment including a system for hands-free deployment of geographically linked applications, according to an embodiment.

FIG. 1 is a block diagram of an example of an environment including a system for hands-free deployment of geographically linked applications, according to an embodiment. As illustrated, the vehicle 105 moves through five stages during the hands-free deployment of a geographically linked application. The stages start with discovery 120, attestation 125, deployment 130, usage 135, and removal 140. Here, the application is geographically linked to the building 115, and a transmitter 110 that provides the beacon, the geographically linked application, or both.

While the examples below discuss geographical context for the applications, some other contexts may also be combined with the geographical context, or used on their own. These other contexts may include time of the day (e.g., at noon, and depending on the location an application is delivered for a restaurant), vehicle state (e.g., when a battery level is low and application to reserve a spot to charge the vehicle 105 is deployed), an emergency (e.g., an application is deployed to help avoid wild fires in the area), among others.

The vehicle 105 includes computer hardware, such as processing circuitry in an infotainment device, and a transceiver to communicate with the transmitter 110 when in operation. The processing circuitry is configured (e.g., at the time of manufacturing, at any time by software, or a combination thereof) to detect a beacon transmitted from the transmitter 110 and received at the transceiver of the vehicle 105.

The processing circuitry is configured to detect beacon that is received by the vehicle's transceiver from the transmitter 110. The same transceiver may be used to receive the beacon as wells as other communications (e.g., with a cellular network), or different transceivers may be used. The beacon is a signal that includes an indication that an application linked to a geographical area covered by the beacon is available. Thus, generally, the transmitter 110 provides the beacon within a limited range covering the geographical area. In an example, the method 600 is extended to include activating the radio transceiver to detect the beacon in response to entering the geographical area. Here, a geofencing technique may be used to search for the beacon when the vehicle enters the geographical area. In an example, the beacon does not identify the application, but merely indicates that some application is available. In any case, the beacon is used to notify the vehicle 105 that a geographically linked application is available for the current area in which the vehicle 105 finds itself.

Once the vehicle 105 is aware that an application is available, the vehicle may start the process by which to acquire and run the application. For example, the processing circuitry may be configured to establish a secure communications link with an application server corresponding to the beacon. Here, the transmitter 110 may provide a physical link to an application server (e.g., collocated with the transmitter 110), or the beacon may include connectivity information to an application server on a different physical link. Generally, the secure link will include exchanging credentials and encrypting communications. In an example, establishing the secure communications link includes providing an identity of the vehicle and attestation data to confirm the identity. The identity and attestation may provide additional assurance to an application provider that the application will function and that the proprietary aspects of the application are not compromised by making it available to the vehicle 105. In an example, the identity of the vehicle is linked to an identity of a user. The linking may be embedded in the identity attestation information, enabling the application provider to separately confirm the user's identity. In an example, the identity of the user corresponds to a set of user preferences for geographically linked applications. Here, the user identity is less important from a security perspective, but rather user customization is available to improve the user experience of the geographically linked application.

In an example, a set of capabilities is provided as part of establishing the secure communications link. The capabilities may include available types of hardware on the vehicle 105, such as which video, audio, or artificial intelligence accelerators, or TEE environments are available. The capabilities may include other resources of the vehicle 105, such as processing power, storage, or working memory. The capabilities may include a current workload or other variable factors that impact the ability of the vehicle 105 to perform a given workload. In general, the capabilities are used by the application provider to determine whether to provide the application, or what version of the application to provide. Thus, if the application will not run, or will likely result in a poor user experience, the provider may withhold the application. Also, there may be several versions of the application to use different accelerators, or provide different functionality, from which to select one to provide the best user experience based on the capabilities.

In an example, the application provider may communicate an application catalog based on the set of capabilities and the identity to the vehicle. Here, the application provider communicates that different applications, or versions of an application, are available. In an example, the application catalog provides metrics for the applications in the catalog to enable the processing circuitry to judge which of the several applications to use. Thus, in an example, the processing circuitry is configured to retrieve performance data for the application from the application catalog and evaluate a current state of the processing circuitry with respect to the performance data to determine that the application passes a threshold. Thus, the processing circuitry establishes that current workloads leave enough computing resources available to run the application without undue impact. In an example, the application is executed in the TEE of the processing circuitry in response to passing the threshold. In an example, the performance data includes expected hardware usage (e.g., profiling numbers about working memory use, storage use, processing power consumption, etc.). In an example, evaluating the current state of the processing circuitry includes determining hardware usage of an already running application, combining the expected hardware usage of the application, and determining that available hardware is greater than the combination of the expected hardware usage and the hardware usage of the already running application.

In an example, the attestation service may provide an application programming interface (API) that may be invoked by a MaaS service once a trip is finished (e.g. end of trip communicated by an Uber like app). This uses the trust chain created to deploy the app. In an example, the API may be used by vendors to protect their work, such as by removing or upgrading an application because of a detected security flaw.

Once attestation has passed, the application provider makes the geographically linked application available to the vehicle 105. This may include starting a transmission of the application (or the application catalog) to the vehicle 105, or it may include providing the vehicle 105 with retrieval information (e.g., address, keys, etc.) to enable the vehicle 105 to retrieve the application. In either case, the processing circuitry is configured to receive the application through the secure communications link.

Once the vehicle 105 has received the application (e.g., an executable or script for the application), the processing circuitry is configured to execute the application in a protected execution environment of the vehicle without intervention by a user of the vehicle. Thus, up until this point, and perhaps beyond, the user (e.g., driver, pilot, or passenger) is unaware of the existence of the application. The protected execution environment provides security for the vehicle 105, and may be implemented in several ways. For example, a virtual machine may be used to isolate the application. In an example, the protected execution environment is bidirectionally secure with other hardware of the vehicle. In an example, the protected execution environment is a hardware implemented trusted execution environment (TEE). This example demonstrates the use of specific hardware in the processing circuitry to provide isolation and security for the application.

In an example, the processing circuitry is configured to detect a removal trigger and remove the application. In an example, the removal trigger is at least one of expiration of a time period, movement beyond the geographical area, or passing beyond a resource use threshold. Thus, the application may only be run for a specific period of time, such as a day. Movement beyond the geographical area may be managed by a satellite positioning system or simply passing beyond the range of the transmitter 110. These examples demonstrate a convenient technique to ensure that many applications may be enjoyed by a user without active maintenance to identify and purge applications that are no longer useful. In contrast, removing the application when a resource threshold is surpassed ensures that the vehicle operations are not impacted by, for example, a misbehaving application, or when circumstances change, and more processing power is needed for other aspects of the vehicle's control.

FIG. 2-FIG. 5 illustrate a prototypical use case for the autonomous service discovery and deployment (e.g., hands-free deployment of geographically linked applications). In broad strokes, a vehicle 205 approaches a geographical area that has a radio-based beacon 230. An edge server 235 is collocated with the beacon 230 and provides edge compute capabilities. The edge server 235 is connected to a cloud 250 that provides cloud services running on one or more datacenters.

Figure 2:
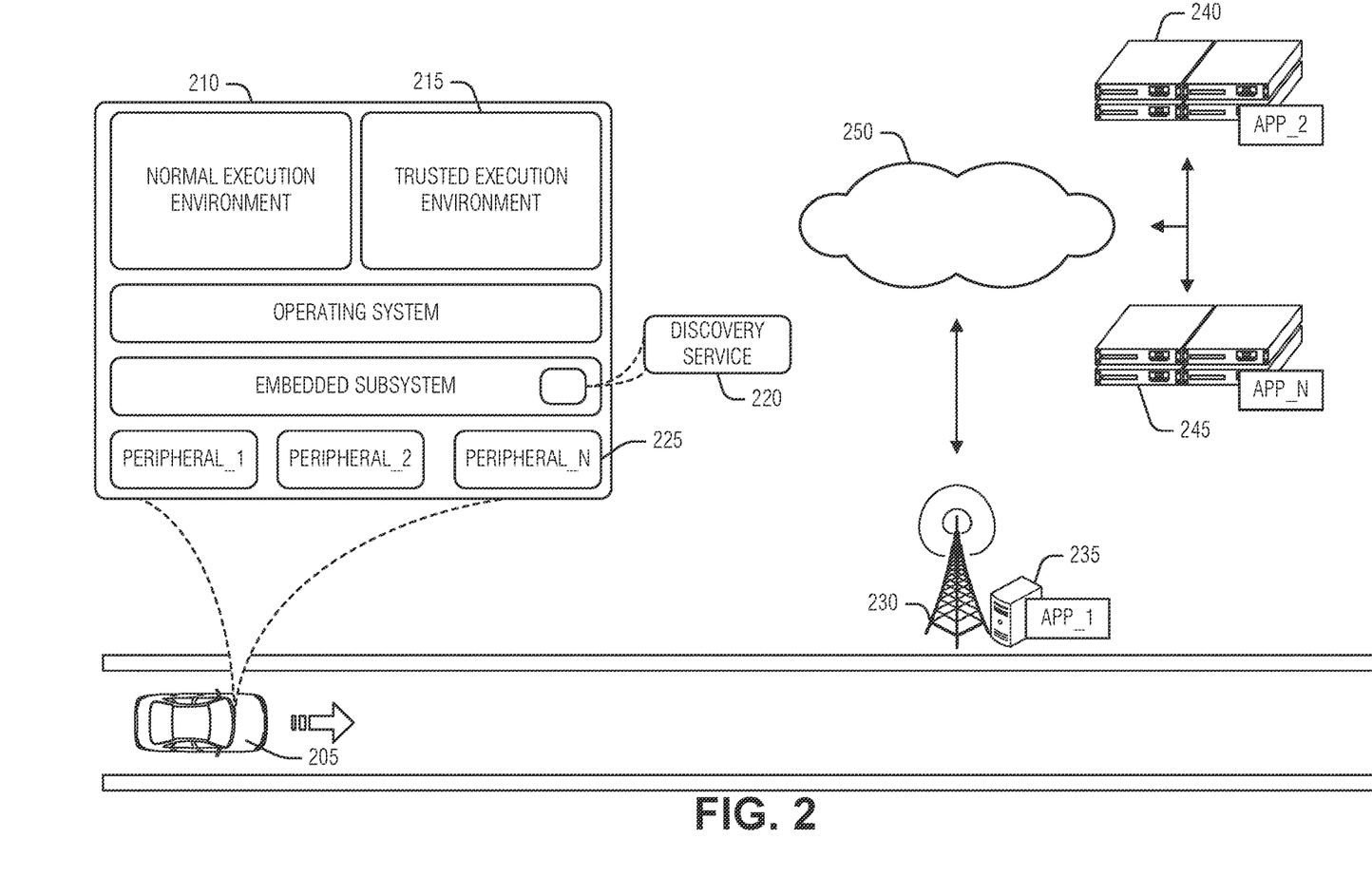
FIG. 2 illustrates an example of the hands-free deployment system as it approaches an application provider, according to an embodiment.

FIG. 2 illustrates an example of the hands-free deployment system as it approaches an application provider (e.g., edge server 235), according to an embodiment. In an example, the vehicle 205 includes a compute device 210, such as part of an advanced driver-assistance system (ADAS), infotainment system, etc. In an example, the compute device 210 includes hardware to execute workloads in a TEE 215. Here, the workloads running on the TEE 215 are isolated from the operating system (OS). This ensures that the OS cannot inspect the contents of the workload running on the TEE 215, nor can the workload access services or data (e.g., from peripherals 225 of the compute device 210) of the OS unless the application is granted access by the OS. Examples of TEE 215 implementations may include SGX or Trust Domain Extensions (TDX).

In an example, the compute device includes an embedded subsystem to execute a discovery service 220 as trusted application. The discovery service 220, like an application running in the TEE 215, is executed independently of the OS. Examples of embedded subsystems to implement the discovery service 220 include a Intel® Converged Security and Manageability Engine (CSME) Intel® Management Engine (ME).

The user may be the owner of the vehicle 205 who is currently driving and paying complete attention to the road. However, in an autonomously driven vehicle, the user may be a person currently renting the vehicle 205 or using it in a MaaS. No matter the user situation, when the vehicle 205 passes the beacon 230 in the given scenario, an application will start running on the compute device 210. Examples of the application may include:

1. An application that provides localized and up to date information to the user of the given geographical areas, such as listing the best parking spots available in the city downtown, or alerts about emergency information.
2. An application that reports the vehicle's position or statistics to a centralized service, such as reporting the battery level in an electric car. The centralized service then uses this information to allocate a charging bay for the vehicle.
3. An application that uses a visualization technology present in the vehicle 205 to provide the user with, for example, road hazard labeling for the current geographical areas, a machine learning output that identifies an exotic animal species only present on that geographical area and warns the user to be careful to not harm the exotic animal, etc.

From the user's point of view, this process is automatic and secure. Automatic in the sense that it does not require any user interaction to get the benefits of the application running, and secure in the sense that the user knows that the application will not misbehave and cause harm due to the isolation of the application with the other subsystems guaranteed by the TEE 215.

In an example, applications may be created following a standard software development process and published into a marketplace of applications. In an example. Software Development Kit (SDK) may be provided to third party application developers to increase the number and quality of available MaaS applications. In an example, the marketplace may be centralized in a cloud-based deployment (e.g., through application provider 240 or application provider 245), or a portion relevant to a given geographical area may be deployed at the geographical area hosted in an edge server 235. The edge deployment may present additional benefits by using a Near-me Area Network (NAN) infrastructure to deploy the application that may improve deployment times by avoiding communicating with the cloud application marketplace through an internet connection, for example.

Although the examples herein discuss a beacon, alternative embodiments may be used in much the same manner as the beacon 230. For example, a virtual-beacon—e.g., an application running in an edge device (such as application server 235 in FIG. 2) using a transmitter—may be employed. Thus, once the vehicle 205 is close and in range of the transmitter, the same functionality as the physical beacon 230. In an example, the range of the transmitter may be too far to be considered "near area" (e.g., a 5G cellular tower). To make it operate as "near-area," the location shared by the vehicle 205, and the location of the virtual-beacon (previously defined) are compared to determine if they are close enough (e.g., within a threshold distance). If they are close enough, then the virtual beacon is treated as detected, and ignored otherwise.

Figure 3:
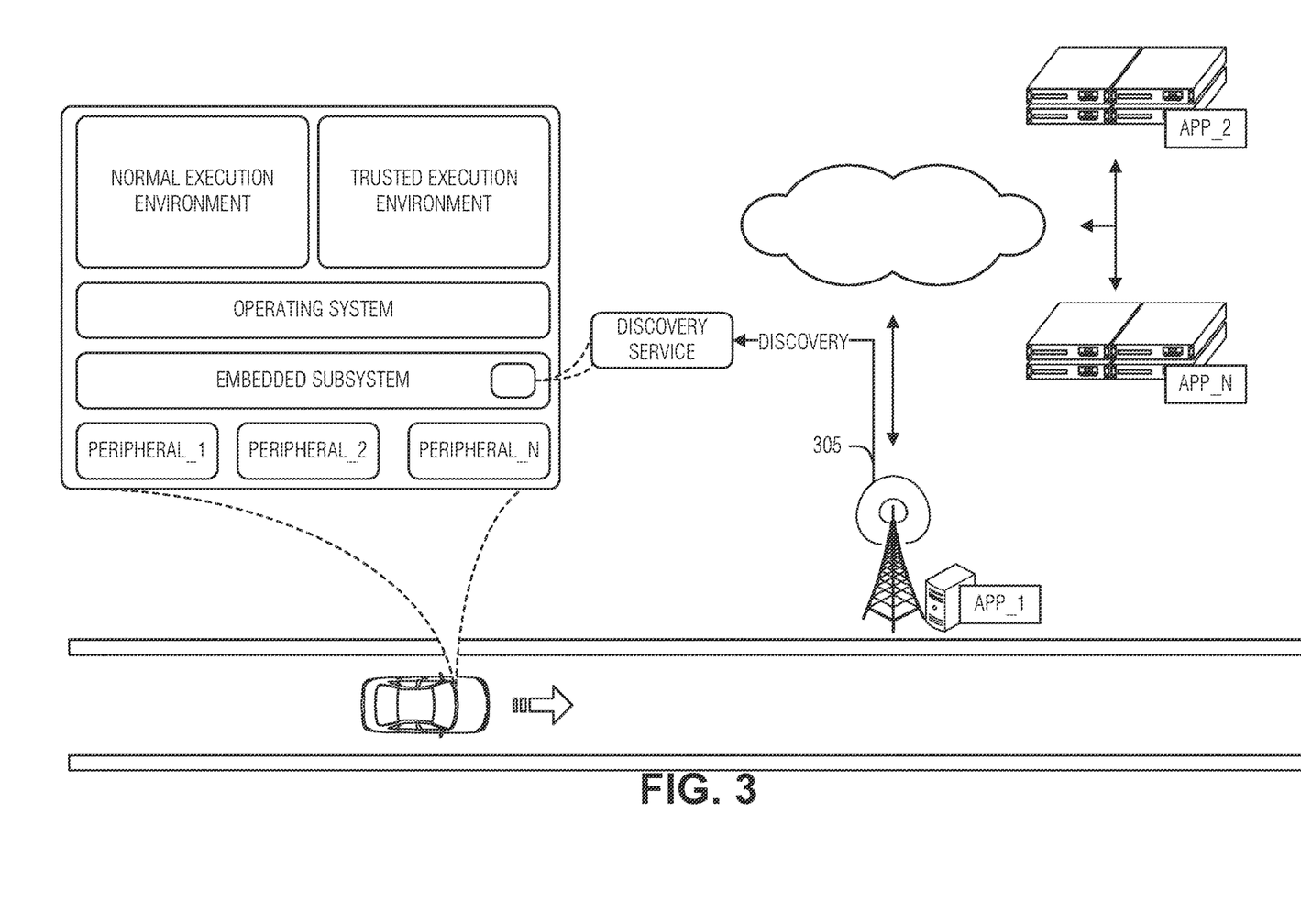
FIG. 3 illustrates an example of the hands-free deployment system performing discovery, according to an embodiment.

FIG. 3 illustrates an example of the hands-free deployment system performing discovery, according to an embodiment. Discovery 305 is the initial phase of the deployment process. In this phase, an environmental parameter is used to publish available services. This environmental parameter may be the current geographical location of the vehicle 205 by a GPS, or the presence of a radio signal in the near geographical location. The environmental parameter is discovered by the discovery service 220 of the compute device 210.

In an example, the environmental parameter is the presence of a beacon in the area. The discovery service 220 detect the radio signals produced by the beacon transmitter and is notified that there are MaaS applications available for execution that will provide value to the user.

Attestation is a phase after discovery 305. Initially, the discovery service 220 will interact with an attestation service running on the cloud 250 or deployed in the near geographical area at an edge location. The purpose of this process is to prove the identity of the compute device 210 using a unique identifier and a secure process to prove that this compute device 210 is the sole owner of that unique identifier. After the identity attestation process is complete, an initial trusted and secure communication channel may be established between the attestation service and the discovery service 220. The secure communication channel will be used for the duration of the process to communicate sensitive information between the actors.

In an example, the compute device 210 unique identifier may be associated with the actual identity of the user. This may be implemented through an out-of-band process to stablish the association, such as the owner of the vehicle 205 associating a personal identity to the unique identifier of the vehicle 205 using a private infrastructure (e.g., an insurance company) or a public service (e.g., the Department of Motor Vehicles (DMV)). In an example, the current user of the vehicle 205 could temporarily link his personal identity to the unique identifier of the compute device 210 using biometric information or a mobile application to establish the physical presence of the person in the vehicle 205. The personal identity may improve the user experience of the applications deployed in the vehicle 205 compute device 210 by, for example fetching user preferences from a cloud service In an example, after the identity attestation process is complete, a capability attestation may be triggered. The capability attestation may include the discovery service 220 publishing the capabilities present or currently available in the vehicle 205. Such capabilities may include any combination of processing power, available memory, the availability of a smart display or a smart windshield technology, accelerators, etc.

As with discovery, the discovery service 220 interacts with the edge server 235 to perform the attestation process or processes. In an example, the processes are performed through a NAN that connects the vehicle 205 with the edge server 235.

Figure 4:
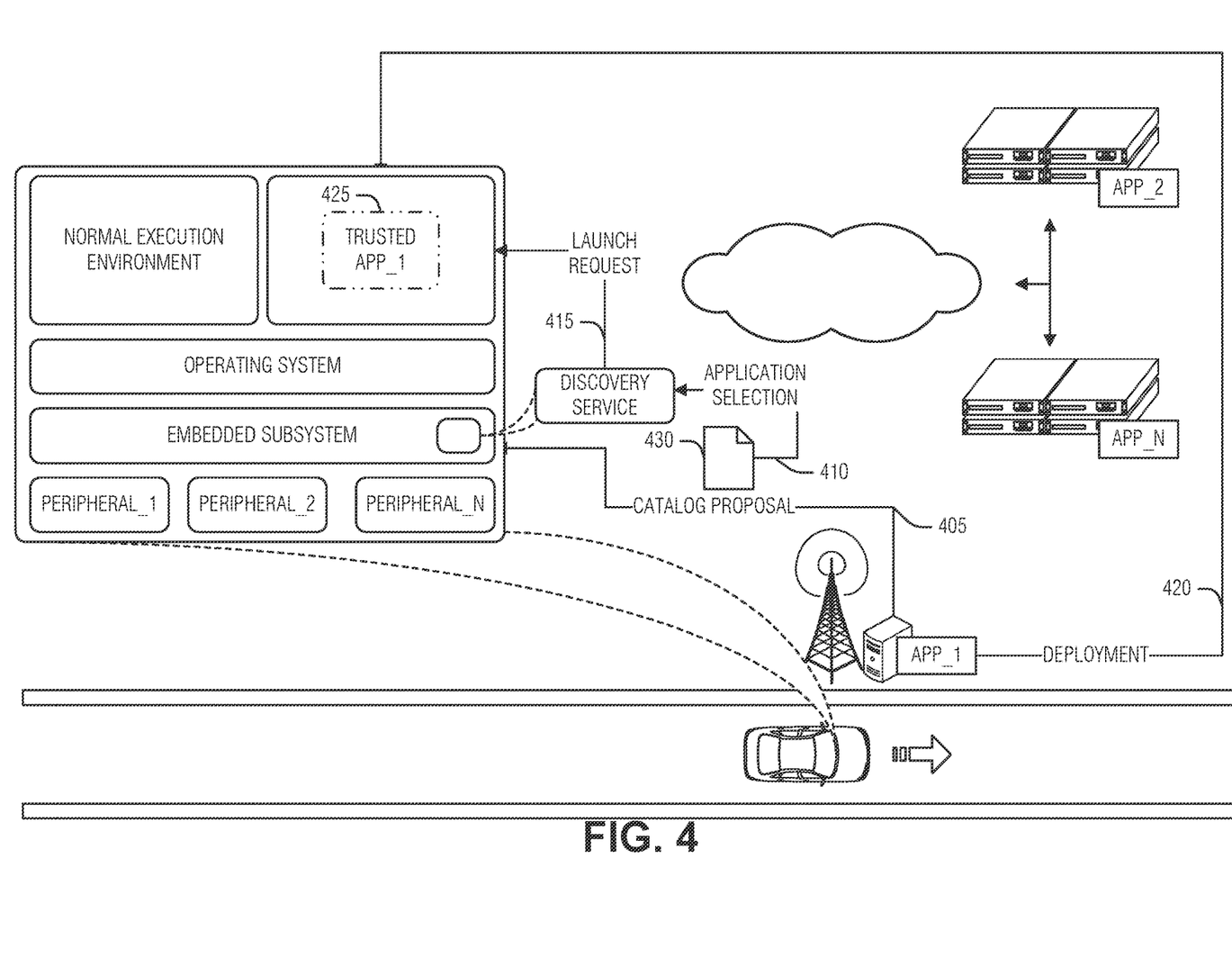
FIG. 4 illustrates an example of the hands-free deployment system deploying an application, according to an embodiment.

FIG. 4 illustrates an example of the hands-free deployment system deploying an application, according to an embodiment. Deployment follows discovery 305 and attestation. With the capabilities reported by the discovery service 220, the attestation service now decides which applications it is going to offer 405 to the vehicle 205 compute device 210 for deployment. A set of examples on criteria for selecting an application catalog may include:

1. Based on a user profile (if available). In this case, the application catalog 430 may be populated with applications that the user may prefer or has already been using.
2. Based on the current capabilities reported by the discovery service 220. In this case, the information received in the capabilities attestation process is used to decide the application catalog 420 contents. For example, applications that requires a Smart Windshield are not offered because of the lack of necessary capability on the vehicle 205.
3. Based on localization policies. In this case, the geographical area may require all vehicles, including the vehicle 205, to run an application to satisfy a law enforcement of governmental policy. For example, an application reporting a maximum velocity or greenhouse gas emission statistics to a central service for monitoring, or in a catastrophic or emergency situation, the geographical area will deploy specific applications that may help to overcome the emergency situation.
4. Based on a bidding process. This may operate similar to advertisement auctions (e.g., bidding) occur on web pages. In this case, third party application providers bid for the opportunity to be deployed in the vehicle 205 compute device 210. For example, three different parking companies may bid for the opportunity to offer their services to the user.

Once the application catalog is generated, it is sent 405 to the discovery service 220. The discovery service 220 makes a decision on whether to deploy an application from the received catalog 430. The discovery service 220 may decide to not deploy an application if, for example, the resources of the vehicle 205 compute device 210 are being used by some other system or process, or if the user experience will be negatively impacted by deploying another application.

As illustrated, the edge server 235 communicates 405 the application catalog 430 to the discovery service 220. The application catalog 430 contains metadata related to the App 1 and App 2. The App 3 is discarded on the application catalog generation process, and thus is not in the application catalog 430. The discovery service 220 selects an application 410 from the proposed catalog 430. The application selected is the App 1, which can be directly installed from the edge server 235 without incurring in internet utilization for downloading the App 1 package like in the App 2 case. A launch request 415 is performed by the discovery service 220 to the TEE 215. The application package is then fetched 420 from the edge server 235 using the previously created secure communication channel. The application package may then be validated and instantiated 425 in the TEE 215.

Once instantiated, the usage phase begins. When running in the TEE 215, the application is effectively isolated from the vehicle 205 systems, such as an ADAS or In-vehicle Infotainment (IVI) system. Access to the data and peripherals 225 must be granted by the discovery service 220, generally only in a need-to-have basis. Once the necessary access is granted to the application, the application may start executing its logic and provide its value to the User.

In an example, the instantiated application 425 is allocated necessary CPU time, working memory allocation, or access to the display, sound, or other systems. For example, a sample application may use a guidance system for consuming promoted city services. The application 425 interacts with the user through the sound subsystem to promote places to visit. Also, once a place is selected, the display is used to show a map with directions to the selected place.

Figure 5:
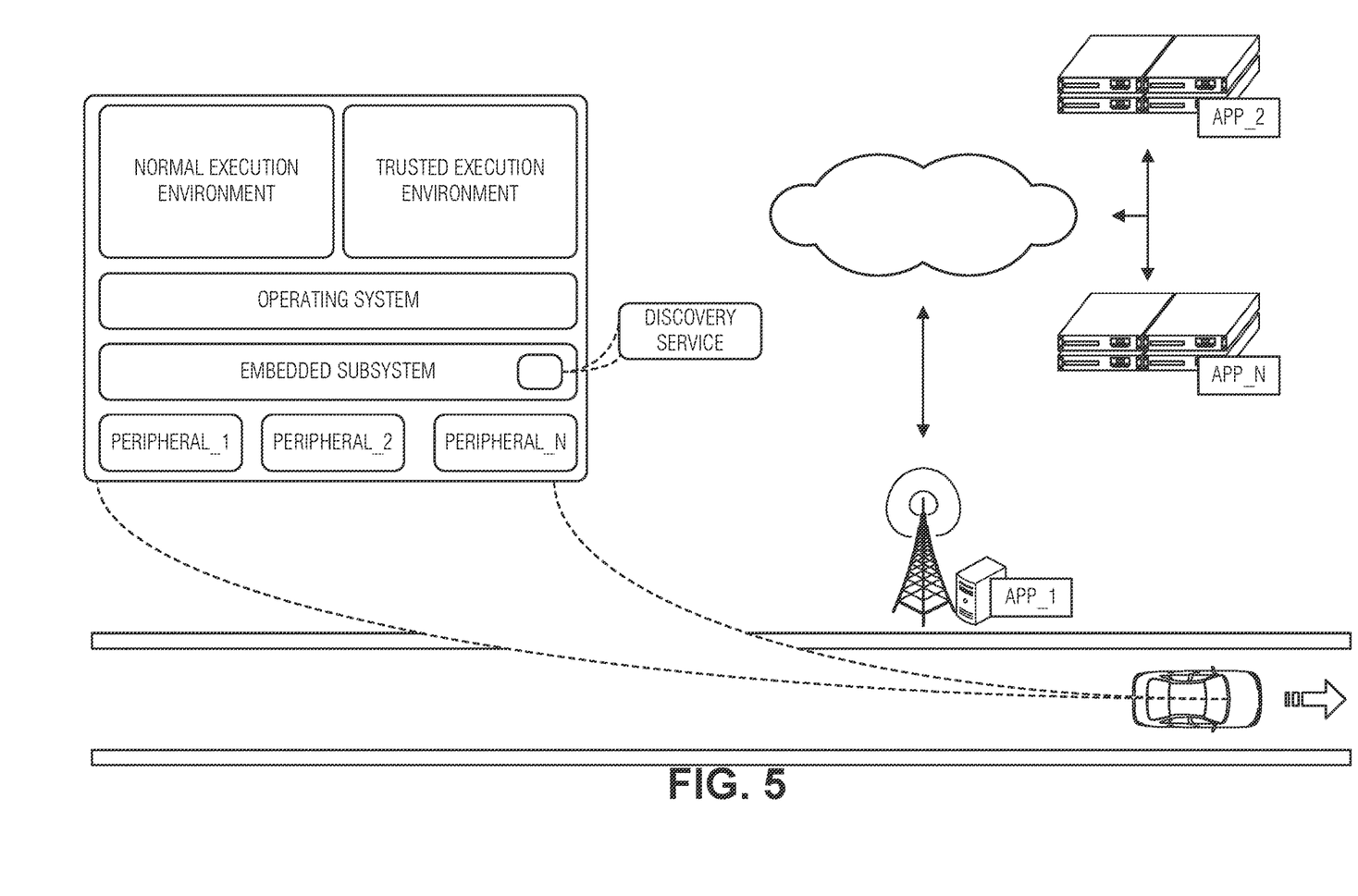
FIG. 5 illustrates an example of the hands-free deployment system removing an application, according to an embodiment.

FIG. 5 illustrates an example of the hands-free deployment system removing an application, according to an embodiment. As the vehicle 205 moves beyond the geographical area, the removal phase may be reached. The removal is triggered based on contextual conditions. A list of potentially applicable conditions may include:
1. Time. A time condition may be used to trigger the removal of the application. After the configured time (e.g., a day, business hours, etc.), the application may be consider no longer needed and removed.
2. Geographical position. A satellite position system (or other localization service) boundary or beacon may be used to notify the discovery service 220 that the application is no longer needed.
3. Resource utilization. The discovery service 220 may determine to schedule a more relevant application and release needed resources necessary by stopping any of the currently deployed applications. For example, in a catastrophic or emergency situation, an entertainment application may be removed to enable applications that provide guidance in the context of the emergency to execute.
4. A combination of contextual conditions. For example, on a self-driving taxi e.g., MaaS), the distance between the geolocation of the vehicle 205 and the geolocation of the user that hired the service may trigger the removal process of the applications when then user moves away from the vehicle 205.

Removal may include destroying the TEE 215 containing the application and its associated data. Given the hardware base isolation characteristic of the TEE 215, removing the instance of the TEE 215 will ensure that no data or confidential information will be left on the vehicle 205 compute device 210. After removal, the resources allocated to the TEE 215 will become available so the discovery service 220 may use them to run additional applications. The third-party application provide is also benefited from the removal process by avoiding disclosure of sensitive intellectual property that may be contained in the application package.

Figure 6:
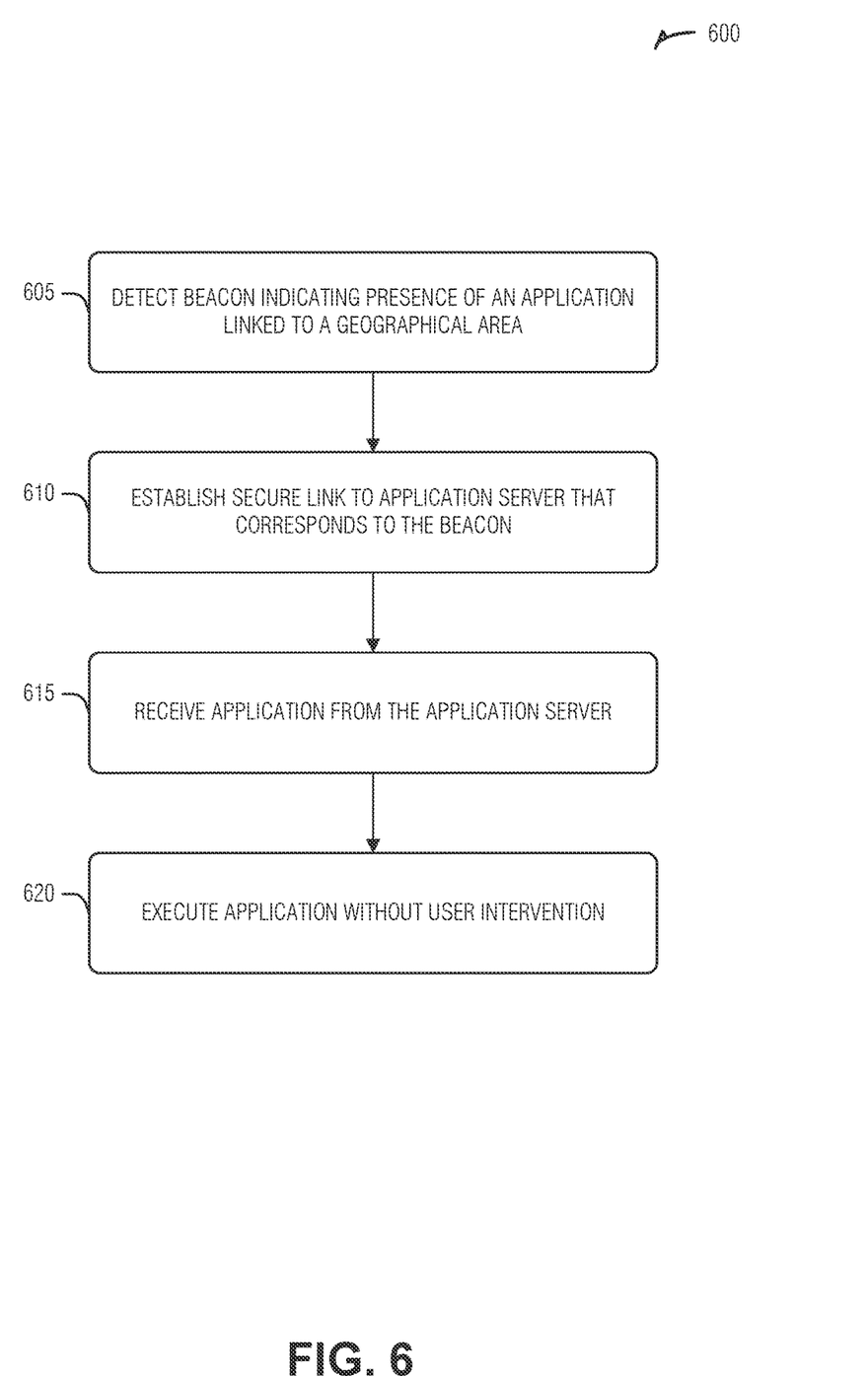
FIG. 6 illustrates a flow diagram of an example of a method for hands-free deployment of geographically linked applications, according to an embodiment.

FIG. 6 illustrates a flow diagram of an example of a method 600 for hands-free deployment of geographically linked applications, according to an embodiment. The operations of the method 600 are performed by computer hardware, such as that described above or below (e.g., processing circuitry).

At operation 605, a beacon is detected. The detection may be performed by a radio transceiver of a vehicle. Here, the beacon includes an indication that an application linked to a geographical area covered by the beacon is available. In an example, the method 600 is extended to include activating the radio transceiver to detect the beacon in response to entering the geographical area.

At operation 610, a secure communications link with an application server corresponding to the beacon is established. In an example, establishing the secure communications link includes providing an identity of the vehicle and attestation data to confirm the identity. In an example, the identity of the vehicle is linked to an identity of a user. In an example, the identity of the user corresponds to a set of user preferences for geographically linked applications.

In an example, a set of capabilities is provided as part of establishing the secure communications link. In an example, the indication that the application linked to the geographical area is available does not identify the application. Here, the method 600 may be extended to include receiving an application catalog based on the set of capabilities and the identity.

In an example, the method 60 is extended to include retrieving performance data for the application from the application catalog and evaluating a current state of the processing circuitry with respect to the performance data to determine that the application passes a threshold. Here, the application is executed in the protected environment in response to passing the threshold. In an example, the performance data includes expected hardware usage. In an example, evaluating the current state of the processing circuitry includes determining hardware usage of an already running application, combining the expected hardware usage of the application, and determining that available hardware is greater than the combination of the expected hardware usage and the hardware usage of the already running application.

At operation 615, an application is received through the secure communications link.

At operation 620, the application is executed in a protected execution environment of the vehicle without intervention by a user of the vehicle. In an example, the protected execution environment is bidirectionally secure with other hardware of the vehicle. In an example, the protected execution environment is a hardware implemented trusted execution environment (TEE).

In an example, the method 600 is extended to include detecting a removal trigger and removing the application. In an example, the removal trigger is at least one of expiration of a time period, movement beyond the geographical area, or passing beyond a resource use threshold.

Figure 7:
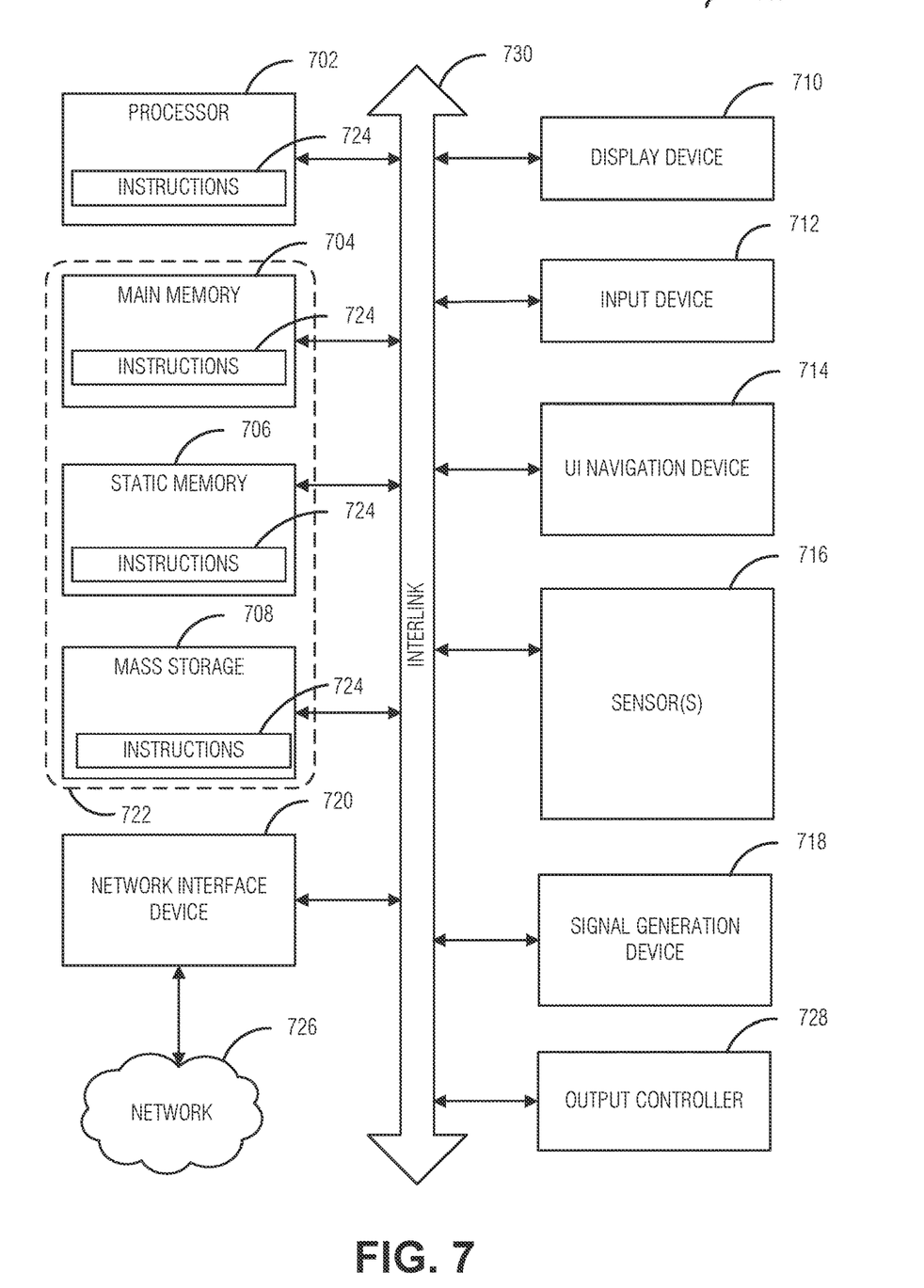
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon based signals, sound signals, etc.). In an example, a non-transitory machine-readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®. IEEE 802.16 family of standards known as WiMax®). IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine-readable medium.

Additional Notes & Examples

Example 1 is an apparatus, in a vehicle, for hands-free deployment of geographically linked applications, the apparatus comprising: a memory including instructions; and processing circuitry that, when in operation, is configured by the instructions to: detect, by a radio transceiver of a vehicle, a beacon, the beacon being a message that includes, an indication that an application linked to a geographical area covered by the beacon is available; establish a secure communications link with an application server corresponding to the beacon; receive, through the secure communications link, an application; and execute, the application in a secured execution environment of the vehicle without intervention by a user of the vehicle.

In Example 2, the subject matter of Example 1 includes, wherein the processing circuitry is configured to activate the radio transceiver to detect the beacon in response to entering the geographical area.

In Example 3, the subject matter of Examples 1-2 includes, wherein, to establish the secure communications link, the processing circuitry is configured to provide: an identity of the vehicle; and attestation data to confirm the identity.

In Example 4, the subject matter of Example 3 includes, wherein the identity of the vehicle is linked to an identity of a user.

In Example 5, the subject matter of Example 4 includes, wherein the identity of the user corresponds to a set of user preferences for geographically linked applications.

In Example 6, the subject matter of Examples 3-5 includes, wherein, to establish the secure communications link, the processing circuitry is configured to provide a set of capabilities.

In Example 7, the subject matter of Example 6 includes, wherein the indication that the application linked to the geographical area is available is independent of identification of the application, and wherein the processing circuitry is configured to receive an application catalog based on the set of capabilities and the identity.

In Example 8, the subject matter of Example 7 includes, wherein the processing circuitry is configured to: retrieve performance data for the application from the application catalog; and evaluate a current state of the processing circuitry with respect to the performance data to determine that the application passes a threshold, wherein the application is executed in the secured environment in response to passing the threshold.

In Example 9, the subject matter of Example 8 includes, wherein the performance data includes expected hardware usage.

In Example 10, the subject matter of Example 9 includes, wherein, to evaluate the current state of the processing circuitry, the processing circuitry is configured to: determine hardware usage of an already running application; combine the expected hardware usage of the application; and determine that available hardware is greater than the combination of the expected hardware usage and the hardware usage of the already running application.

In Example 11, the subject matter of Examples 1-10 includes, wherein the processing circuitry is configured to: detect a removal trigger; and remove the application.

In Example 12, the subject matter of Example 11 includes, wherein the removal trigger is at least one of expiration of a time period, movement beyond the geographical area, or passing beyond a resource use threshold.

In Example 13, the subject matter of Examples 1-12 includes, wherein the secured execution environment is bidirectionally secure with other hardware of the vehicle.

In Example 14, the subject matter of Example 13 includes, wherein the secured execution environment is a hardware implemented trusted execution environment (TEE).

Example 15 is a method for hands-free deployment of geographically linked applications, the method comprising: detecting, by a radio transceiver of a vehicle, a beacon, the beacon being a message that includes, an indication that an application linked to a geographical area covered by the beacon is available; establishing, by processing circuitry of the vehicle, a secure communications link with an application server corresponding to the beacon; receiving, through the secure communications link, an application; and executing, by the processing circuitry, the application in a secured execution environment of the vehicle without intervention by a user of the vehicle.

In Example 16, the subject matter of Example 15 includes, activating the radio transceiver to detect the beacon in response to entering the geographical area.

In Example 17, the subject matter of Examples 15-16 includes, wherein establishing the secure communications link includes providing: an identity of the vehicle; and attestation data to confirm the identity.

In Example 18, the subject matter of Example 17 includes, wherein the identity of the vehicle is linked to an identity of a user.

In Example 19, the subject matter of Example 18 includes, wherein the identity of the user corresponds to a set of user preferences for geographically linked applications.

In Example 20, the subject matter of Examples 17-19 includes, wherein establishing the secure communications link includes providing a set of capabilities.

In Example 21, the subject matter of Example 20 includes, wherein the indication that the application linked to the geographical area is available is independent of identification of the application, and wherein the processing circuitry is configured to receive an application catalog based on the set of capabilities and the identity.

In Example 22, the subject matter of Example 21 includes, retrieving performance data for the application from the application catalog; and evaluating a current state of the processing circuitry with respect to the performance data to determine that the application passes a threshold, wherein the application is executed in the secured environment in response to passing the threshold.

In Example 23, the subject matter of Example 22 includes, wherein the performance data includes expected hardware usage.

In Example 24, the subject matter of Example 23 includes, wherein evaluating the current state of the processing circuitry includes: determining hardware usage of an already running application; combining the expected hardware usage of the application; and determining that available hardware is greater than the combination of the expected hardware usage and the hardware usage of the already running application.

In Example 25, the subject matter of Examples 15-24 includes, detecting a removal trigger; and removing the application.

In Example 26, the subject matter of Example 25 includes, wherein the removal trigger is at least one of expiration of a time period, movement beyond the geographical area, or passing beyond a resource use threshold.

In Example 27, the subject matter of Examples 15-26 includes, wherein the secured execution environment is bidirectionally secure with other hardware of the vehicle.

In Example 28, the subject matter of Example 27 includes, wherein the secured execution environment is a hardware implemented trusted execution environment (TEE).

Example 29 is at least one machine-readable medium including instructions that, when executed by processing circuitry of a vehicle, cause the processing circuitry to perform operations comprising: detecting, by a radio transceiver of a vehicle, a beacon, the beacon being a message that includes, an indication that an application linked to a geographical area covered by the beacon is available; establishing a secure communications link with an application server corresponding to the beacon; receiving, through the secure communications link, an application; and executing, by the processing circuitry, the application in a secured execution environment of the vehicle without intervention by a user of the vehicle.

In Example 30, the subject matter of Example 29 includes, wherein the operations comprise activating the radio transceiver to detect the beacon in response to entering the geographical area.

In Example 31, the subject matter of Examples 29-30 includes, wherein establishing the secure communications link includes providing: an identity of the vehicle; and attestation data to confirm the identity.

In Example 32, the subject matter of Example 31 includes, wherein the identity of the vehicle is linked to an identity of a user.

In Example 33, the subject matter of Example 32 includes, wherein the identity of the user corresponds to a set of user preferences for geographically linked applications.

In Example 34, the subject matter of Examples 31-33 includes, wherein establishing the secure communications link includes providing a set of capabilities.

In Example 35, the subject matter of Example 34 includes, wherein the indication that the application linked to the geographical area is available is independent of identification of the application, and wherein the processing circuitry is configured to receive an application catalog based on the set of capabilities and the identity.

In Example 36, the subject matter of Example 35 includes, wherein the operations comprise: retrieving performance data for the application from the application catalog; and evaluating a current state of the processing circuitry with respect to the performance data to determine that the application passes a threshold, wherein the application is executed in the secured environment in response to passing the threshold.

In Example 37, the subject matter of Example 36 includes, wherein the performance data includes expected hardware usage.

In Example 38, the subject matter of Example 37 includes, wherein evaluating the current state of the processing circuitry includes: determining hardware usage of an already running application; combining the expected hardware usage of the application; and determining that available hardware is greater than the combination of the expected hardware usage and the hardware usage of the already running application.

In Example 39, the subject matter of Examples 29-38 includes, wherein the operations comprise: detecting a removal trigger; and removing the application.

In Example 40, the subject matter of Example 39 includes, wherein the removal trigger is at least one of expiration of a time period, movement beyond the geographical area, or passing beyond a resource use threshold.

In Example 41, the subject matter of Examples 29-40 includes, wherein the secured execution environment is bidirectionally secure with other hardware of the vehicle.

In Example 42, the subject matter of Example 41 includes, wherein the secured execution environment is a hardware implemented trusted execution environment (TEE).

Example 43 is a system for hands-free deployment of geographically linked applications, the system comprising: means for detecting, by a radio transceiver of a vehicle, a beacon, the beacon being a message that includes, an indication that an application linked to a geographical area covered by the beacon is available; means for establishing, by processing circuitry of the vehicle, a secure communications link with an application server corresponding to the beacon; means for receiving, through the secure communications link, an application; and means for executing, by the processing circuitry, the application in a secured execution environment of the vehicle without intervention by a user of the vehicle.

In Example 44, the subject matter of Example 43 includes, means for activating the radio transceiver to detect the beacon in response to entering the geographical area.

In Example 45, the subject matter of Examples 43-44 includes, wherein the means for establishing the secure communications link include means for providing: an identity of the vehicle; and attestation data to confirm the identity.

In Example 46, the subject matter of Example 45 includes, wherein the identity of the vehicle is linked to an identity of a user.

In Example 47, the subject matter of Example 46 includes, wherein the identity of the user corresponds to a set of user preferences for geographically linked applications.

In Example 48, the subject matter of Examples 45-47 includes, wherein the means for establishing the secure communications link include means for providing a set of capabilities.

In Example 49, the subject matter of Example 48 includes, wherein the indication that the application linked to the geographical area is available is independent of identification of the application, and wherein the processing circuitry is configured to receive an application catalog based on the set of capabilities and the identity.

In Example 50, the subject matter of Example 49 includes, means for retrieving performance data for the application from the application catalog; and means for evaluating a current state of the processing circuitry with respect to the performance data to determine that the application passes a threshold, wherein the application is executed in the secured environment in response to passing the threshold.

In Example 51, the subject matter of Example 50 includes, wherein the performance data includes expected hardware usage.

In Example 52, the subject matter of Example 51 includes, wherein the means for evaluating the current state of the processing circuitry include: means for determining hardware usage of an already running application; means for combining the expected hardware usage of the application; and means for determining that available hardware is greater than the combination of the expected hardware usage and the hardware usage of the already running application.

In Example 53, the subject matter of Examples 43-52 includes, means for detecting a removal trigger; and means for removing the application.

In Example 54, the subject matter of Example 53 includes, wherein the removal trigger is at least one of expiration of a time period, movement beyond the geographical area, or passing beyond a resource use threshold.

In Example 55, the subject matter of Examples 43-54 includes, wherein the secured execution environment is bidirectionally secure with other hardware of the vehicle.

In Example 56, the subject matter of Example 55 includes, wherein the secured execution environment is a hardware implemented trusted execution environment (TEE).

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus, in a vehicle, for hands-free deployment of geographically linked applications, the apparatus comprising:
   a memory capable of storing instructions; and
   processing circuitry that, when in operation, is configured by the instructions to:
      activate a radio transceiver of the vehicle to detect a beacon based on entering a geographical area covered by a beacon;
      detect, by the activated radio transceiver of the vehicle, the beacon, the beacon being a message that is based on availability of an application linked to the geographical area covered by the beacon;
      establish a secure communications link with an application server corresponding to the beacon, wherein, to establish the secure communications link, the processing circuitry is configured to provide a set of capabilities that include a type of hardware of the vehicle that is available;
      receive an application catalog, based on the type of hardware in the set of capabilities, that includes metrics of the application and one or more other versions of the application;
      judge, based on receipt of the application catalog, which of the application and the one or more other versions of the application to use based on the included metrics, including the processing circuitry to:
         retrieve performance data for the application from the application catalog;
         evaluate a current state of the processing circuitry with respect to the performance data to determine that the application passes a threshold; and
         select the application over the one or more other versions of the application in the application catalog based on the performance data passing the threshold;
      receive, through the secure communications link based on the selection of the application; and
      execute, the application in a secured execution environment of the vehicle without intervention by a user of the vehicle.

2. The apparatus of claim 1, wherein, to establish the secure communications link, the processing circuitry is configured to provide:
   an identity of the vehicle; and
   attestation data to confirm the identity.

3. The apparatus of claim 2, wherein the identity of the vehicle is linked to an identity of a user.

4. The apparatus of claim 3, wherein the identity of the user corresponds to a set of user preferences for geographically linked applications.

5. The apparatus of claim 2, wherein the availability of the application linked to the geographical area is independent of identification of the application, and wherein the processing circuitry is configured to receive an application catalog based on the set of capabilities and the identity.

6. The apparatus of claim 1, wherein the performance data includes expected hardware usage.

7. The apparatus of claim 6, wherein, to evaluate the current state of the processing circuitry, the processing circuitry is configured to:
   determine hardware usage of an already running application;
   combine the expected hardware usage of the application; and
   determine that available hardware is greater than the combination of the expected hardware usage and the hardware usage of the already running application.

8. The apparatus of claim 1, wherein the processing circuitry is configured to:
   detect a removal trigger; and
   remove the application.

9. The apparatus of claim 8, wherein the removal trigger is at least one of expiration of a time period, movement beyond the geographical area, or passing beyond a resource use threshold.

10. The apparatus of claim 1, wherein the secured execution environment is bidirectionally secure with other hardware of the vehicle.

11. The apparatus of claim 10, wherein the secured execution environment is a hardware implemented trusted execution environment (TEE).

12. The apparatus of claim 1, wherein members of the set of capabilities include:
   available types of hardware on the vehicle;
   vehicle resources including processing power, storage, or working memory; or
   a current workload of the processing circuitry.

13. At least one non-transitory machine-readable medium capable of storing instructions that, when executed by processing circuitry of a vehicle, cause the processing circuitry to perform operations comprising:
   activating a radio transceiver of the vehicle to detect a beacon based on entering a geographical area covered by a beacon;
   detecting, by the activated radio transceiver of the vehicle, the beacon, the beacon being a message that is based on availability of an application linked to the geographical area covered by the beacon;
   establishing a secure communications link with an application server corresponding to the beacon, wherein establishing the secure communications link includes providing a set of capabilities that include a type of hardware of the vehicle that is available;
   receiving an application catalog, based on the type of hardware in the set of capabilities, that includes metrics of the application and one or more other versions of the application;
   judging, based on receipt of the application catalog, which of the application and the one or more other versions of the application to use based on the included metrics by:
      retrieving performance data for the application from the application catalog;
      evaluating a current state of the processing circuitry with respect to the performance data to determine that the application passes a threshold; and
      selecting the application over the one or more other versions of the application in the application catalog based on the performance data passing the threshold;
   receiving, through the secure communications link based on the selection of the application; and
   executing, by the processing circuitry, the application in a secured execution environment of the vehicle without intervention by a user of the vehicle based on the application passing the threshold.

14. The at least one non-transitory machine-readable medium of claim 13, wherein establishing the secure communications link includes providing:
   an identity of the vehicle; and
   attestation data to confirm the identity.

15. The at least one non-transitory machine-readable medium of claim 14, wherein the availability of the application linked to the geographical area is independent of identification of the application, and wherein the processing circuitry is configured to receive an application catalog based on the set of capabilities and the identity.

16. The at least one non-transitory machine-readable medium of claim 13, wherein the performance data includes expected hardware usage.

17. The at least one non-transitory machine-readable medium of claim 16, wherein evaluating the current state of the processing circuitry includes:
   determining hardware usage of an already running application;
   combining the expected hardware usage of the application; and
   determining that available hardware is greater than the combination of the expected hardware usage and the hardware usage of the already running application.

18. The at least one non-transitory machine-readable medium of claim 13, wherein the operations comprise:
   detecting a removal trigger; and
   removing the application.

19. The at least one non-transitory machine-readable medium of claim 18, wherein the removal trigger is at least one of expiration of a time period, movement beyond the geographical area, or passing beyond a resource use threshold.

20. The at least one non-transitory machine-readable medium of claim 13, wherein the secured execution environment is bidirectionally secure with other hardware of the vehicle.

21. The at least one non-transitory machine-readable medium of claim 13, wherein members of the set of capabilities include:
   available types of hardware on the vehicle;
   vehicle resources including processing power, storage, or working memory; or
   a current workload of the processing circuitry of the vehicle.

22. A system for hands-free deployment by a vehicle of geographically linked applications, the system comprising:
   means for activating a radio transceiver of the vehicle to detect a beacon based on entering a geographical area covered by a beacon;
   means for detecting, by the activated radio transceiver of the vehicle, the beacon, the beacon being a message that is based on availability of an application linked to the geographical area covered by the beacon;
   means for establishing a secure communications link with an application server corresponding to the beacon, wherein the means for establishing the secure communications link include means for providing a set of capabilities that include a type of hardware of the vehicle that is available;
   means for receiving an application catalog, based on the type of hardware in the set of capabilities, that includes metrics of the application and one or more other versions of the application;
   means for judging, based on receipt of the application catalog, which of the application and the one or more other versions of the application to use based on the included metrics by:
      means for retrieving performance data for the application from the application catalog;
      means for evaluating a current state of the system with respect to the performance data to determine that the application passes a threshold; and
      means for selecting the application over the one or more other versions of the application in the application catalog based on the performance data passing the threshold;
   means for receiving, through the secure communications link based on the selection of the application; and
   means for executing the application in a secured execution environment of the vehicle without intervention by a user of the vehicle based on the application passing the threshold.

23. The system of claim 22 comprising:
   means for detecting a removal trigger; and
   means for removing the application.

* * * * *